H. W. BARGER.
COMBINATION POWER AND STEERING KNUCKLE.
APPLICATION FILED DEC. 31, 1915.
1,212,882.
Patented Jan. 16, 1917.
2 SHEETS—SHEET 1.
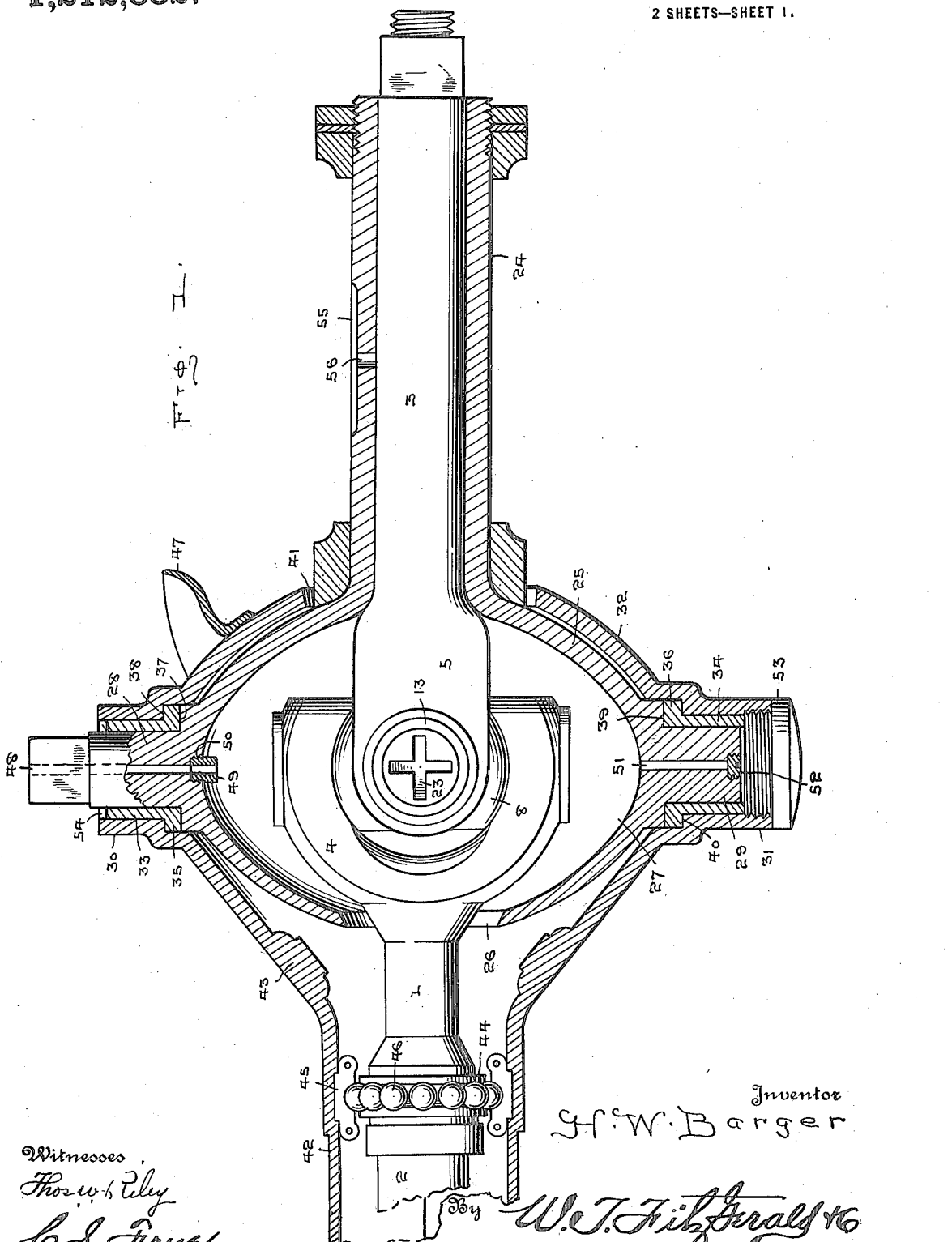
Witnesses
Thos. W. Riley
C. S. Frye
Inventor
H. W. Barger
By W. J. FitzGerald
Attorney

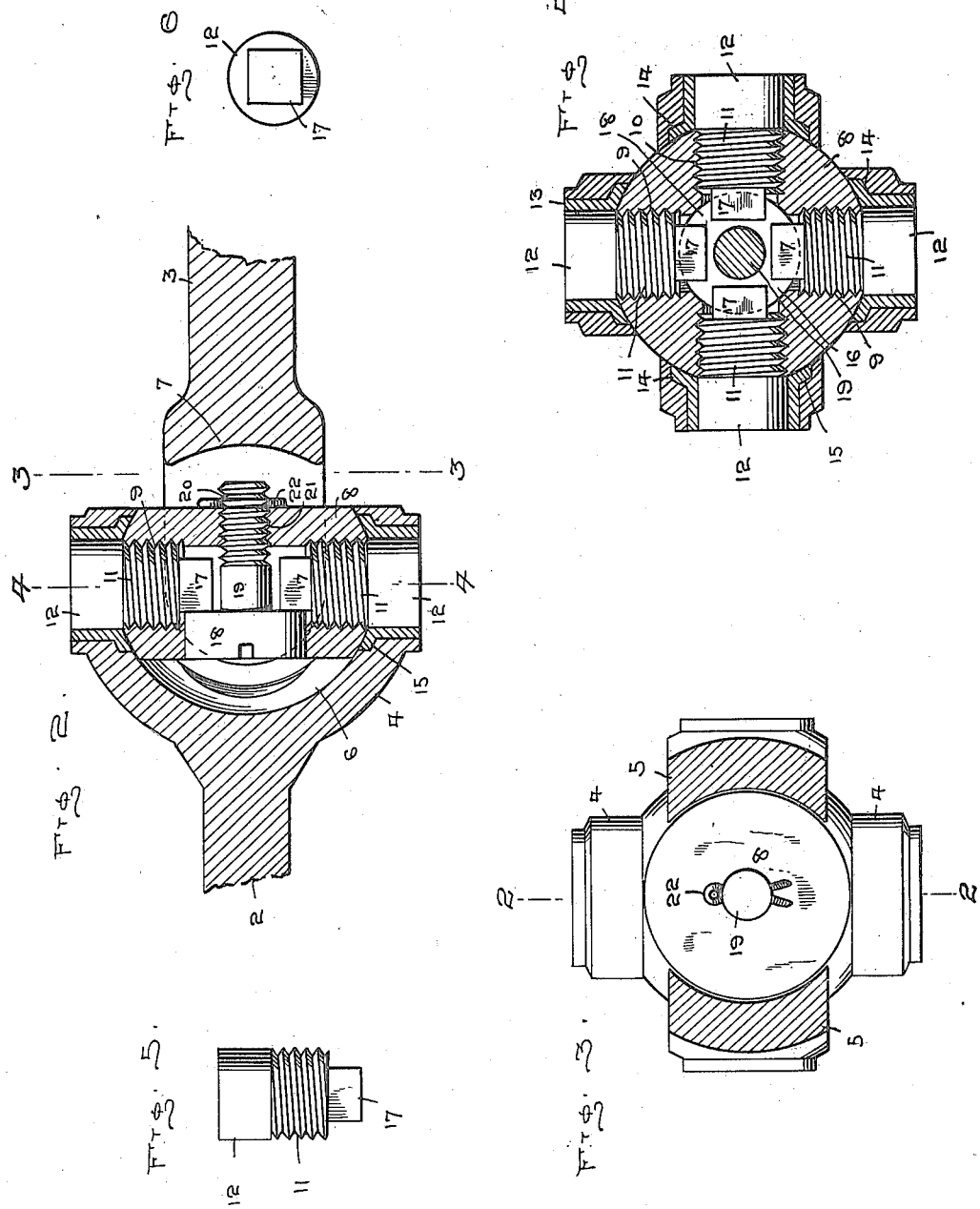

UNITED STATES PATENT OFFICE.

HENRY W. BARGER, OF TOLEDO, ILLINOIS.

COMBINATION POWER AND STEERING KNUCKLE.

1,212,882. Specification of Letters Patent. Patented Jan. 16, 1917.

Application filed December 31, 1915. Serial No. 69,658.

*To all whom it may concern:*

Be it known that I, HENRY W. BARGER, a citizen of the United States, residing at Toledo, in the county of Cumberland and State of Illinois, have invented certain new and useful Improvements in Combination Power and Steering Knuckles; and I do hereby declare the following to be a full, clear, and exact description of the invention, such as will enable others skilled in the art to which it appertains to make and use the same.

My invention relates to new and useful improvements in combination power and steering knuckles and more particularly to that class used in connection with four wheel drives and is an improvement over my former Patent No. 982,117 dated January 17, 1911, and my object is to provide a universal joint connection in the front axle and position the same in a suitable housing.

A further object is to provide an oil receptacle in which the universal joint rotates, whereby said joint will be properly lubricated.

A further object is to provide a casing for the housing and axle.

A further object is to provide suitable bearings for the reception of posts carried by the housing.

A further object is to provide suitable bearing points for the parts of the universal joint.

A further object is to provide means whereby the universal joint and oil receptacle may be thoroughly cleansed when desired.

A further object is to provide means for causing the lubricant to descend directly on to the universal joint without descending around the walls of the oil receptacle. And a further object is to provide a shield for preventing dirt, sand, and the like, from entering the opening at the end of the casing through which the wheel supporting end of the axle projects.

Other objects and advantages will be hereinafter set forth and more particularly pointed out in the accompanying specification.

In the accompanying drawings which are made a part of this application, Figure 1 is a vertical, central, longitudinal, sectional view through the housing and casing, showing the axle positioned therein. Fig. 2 is a longitudinal sectional view through the universal joint as seen on line 2—2 of Fig. 3. Fig. 3 is a sectional view through the universal joint as seen on line 3—3 of Fig. 2. Fig. 4 is a central sectional view through the universal joint as seen on line 4—4 of Fig. 2. Fig. 5 is an elevation of a bearing pin used in connection with the universal joint, and Fig. 6 is an end elevation thereof.

Referring to the drawings in which similar reference numerals designate corresponding parts throughout the several views, 1 indicates an axle which is preferably formed in two sections 2 and 3, the section 2 extending to the driving mechanism of the vehicle, while the section 3 forms a support for the wheel of the vehicle.

The meeting ends of the two sections 2 and 3 are provided with yokes 4 and 5 respectively, said yokes being hollowed out to form curved faces or cavities 6 and 7 for the reception of a substantially globular block 8, the curvatures of the faces 6 and 7 being such as to snugly fit the curved face of the block.

Extending through the block 8 from edge to edge thereof are openings 9 and 10, which openings are positioned at right angles to each other, portions of said openings being threaded to receive the threaded ends 11 of bearing pins 12, said portion of the bearing pins projecting beyond the block 8 being smooth and circular to fit the bushings 13 in the ends of the yoke members 4 and 5, said bushings having radial flanges 14 at their inner ends which engage recesses 15 in the inner faces of the yokes to prevent the bushings from leaving the openings in the yokes. The inner ends of the bearing pins 12 project into a cavity 16 formed at the intersection of the openings 9 and 10, said ends terminating in square shanks 17 with which engages the enlarged head 18 of a locking bolt 19, the end of the bolt opposite the head 18 having threads 20 for engagement with the threaded opening 21 in one wall of the block 8 and by turning the flat shoulder of the head 18 against the flat faces of the shanks 17, the bearing pins 12 will be securely held against rotation and the bolt 19 is held against rotation by introducing a cotter pin, or the like, 22 through the end of the bolt projecting beyond the face of the block 8.

In order to readily turn the bearing pins into or out of engagement with the block 8 the outer ends of said pins are provided with slots 23 which are in crossed relation with each other, so that by introducing a tool into the slots and applying rotating power thereto, the bearing pins may be readily operated, and by forming the side faces of the squared shanks of the pins parallel with the slots 23 the faces of the shanks may be readily positioned to engage with the flat face of the head of the locking bolt.

The axle section 3 is surrounded by a sleeve or boxing 24, the inner end of the sleeve terminating in an oval-shaped housing 25, one face of the housing having an elongated opening 26 through which extends the axle section 2 and by means of which the universal joint members are introduced into the housing, the hollow of the housing extending a distance above and below the universal joint to provide an oil chamber 27 and as the opening 26 and the sleeve 24 intersect the housing at its vertical center, a considerable space will be formed for retaining the lubricant.

The upper and lower ends of the housing 25 are provided with integral pivot posts 28 and 29 respectively, said posts extending through tubular extensions 30 and 31 of a casing 32, said casing surrounding the housing 25, each pivot post being surrounded by a bushing 33 and 34 respectively, the inner ends of which are provided with peripheral flanges 35 and 36 which are positioned between shoulders 37 and 38 formed on the pivot post 28 and tubular extension 30 and between shoulders 39 and 40 formed on the pivot post 29 and tubular extension 31, thereby holding said bushings against longitudinal movement.

The casing 32 fits loosely around the housing 25 and is provided with an elongated horizontally extending slot 41 through which the sleeve 24 extends, said slot being of sufficient length to permit the sleeve and axle section 3 to swing forwardly and rearwardly to guide the vehicle wheels. That portion of the casing surrounding the opening 26 of the housing is preferably flared and terminates in a sleeve 42 which surrounds the section 2 of the axle and extends longitudinally thereof, the casing 32 and sleeve 42 being formed of an upper and lower section so as to readily introduce the same around the housing 25 and the axle, said casing sections being secured together in any suitable manner.

The flared portion of the casing 42 is provided with a reinforcing rib 43 adjacent its connection with the sleeve portion 42 so as to reinforce the casing at this point and provide a base for the reception of screws, or the like, (not shown) employed for securing the usual form of reach rod to the casing.

A suitable ball bearing cone 44 is introduced around the axle section 2 adjacent the point of entrance of the axle section through the opening 26, a race 45 being engaged with the sleeve portion 42 of the casing for retaining the bearing balls 46 in engagement with the cone 44, thus holding the axle in perfect alinement with the sleeve and also with the oval housing.

To prevent an undue amount of grit, sand, or other substances from descending over the face of the casing 32 and entering the slot 41, a shield 47 is attached to the face of the casing 32, said shield projecting outwardly from the casing and extending longitudinally of the slot 41 so as to collect the sand, etc., and carry the same beyond the ends of the slot before it is discharged from the shield, this manner of positioning the shield permitting the wheel to be placed nearer the knuckle formed by the housing and casing.

A lubricant is introduced into the chamber 27 through a port 48 extending vertically through the pivot post 28, and in order to cause the lubricant to drop directly upon the universal joint and not be carried around the universal joint upon the walls of the chamber, an extension plug 49 is threaded into engagement with a seat 50 at the lower end of the port 48, said plug extending beyond the wall of the oil chamber 27 so that the lubricant will descend directly upon the universal joint.

The lower pivot post 29 is likewise provided with a vertical port 51 which is normally closed at its lower end by means of a cap screw 52 to prevent the passage of the lubricant from the chamber 27 until such time as it is desired to do so, and in order to provide for thoroughly cleansing the oil chamber and universal joint as by introducing coal oil, or the like into the chamber, a closure cap 53 is threaded into the end of the tubular extension 31, said cap also preventing the passage of lubricant from the lower end of said extension.

In cleansing the oil chamber and universal joint, the closure cap 53 is removed as is also the cap screw 52 when coal oil or similar substance is introduced through the port 48 which will thoroughly cleanse the walls of the oil chamber and the parts of the universal joint and will pass out of the chamber 27 through the port 51. After the cleansing process has been completed, the cap screw and closure cap are returned to their respective positions and a proper amount of lubricant introduced into the chamber 27 through the port 48.

In order to properly lubricate the bearing surface of the pivot post 28, the bushing 33 is terminated a distance from the upper end of the tubular extension 30 thus forming a channel 54 between the tubular extension and the pivot post into which a small amount of the lubricant may be placed which will percolate between the pivot post and bushing and properly lubricate the same.

In order to properly lubricate the bearings of the wheel hub mounted upon the sleeve 24, the upper face of the sleeve is provided with an elongated recess 55 with which communicates a bore 56 extending from the recess to the inner face of the sleeve so that the lubricant may readily pass therethrough.

In assembling the parts of the knuckle construction, the semi-globular block 8 is secured within the yoke 5 of the axle section 3 and then rotated until the flat faces of the block 8 are flush with the edges of the yoke when the axle section 3 is introduced through the opening 26 and properly seated in the sleeve 24. The axle section 3 is then given a half rotation from the position shown in Fig. 1 when the yoke 4 is entered through the opening 26 and passed to opposite sides of the semi-globular block to bring the openings in the ends of the yoke into registration with the openings 9. The axle section 3 is then swung to the right or left the full distance of the opening 41 when one of the pins 12 is entered through the opening at one end of the yoke and into one of the openings 9 of the block, after which the axle section 3 is rotated a half turn so that the other bearing pin can be introduced into position, it being understood that the yoke 4 is given a half turn from the position shown in Fig. 1 when the bearing pins are being introduced. After the two yokes are properly secured to the bearing block the axle section 2 is rotated until the yoke 4 is in the position shown in Fig. 1, when the axle section 2 is again swung to either the right or left and the locking bolt 19 engaged with the ends of the bearing pins. The axle section 2 is again given a half turn and swung to one end of the opening 26 when the cotter pin 22 may be introduced through the opening in the locking bolt. The casing 32 is then introduced around the housing and parts of the axle and secured therearound in the usual manner. A wheel is then attached to the end of the axle section 3 over the sleeve 24 in the usual manner and by positioning the shield upon the casing as shown to protect the slot 41, the wheel may be moved much more closely to the knuckle joint than if the shield was placed directly around the mouth of the slot.

Having thus fully described my invention what I claim as new and desire to secure by Letters Patent of the United States is:—

1. A combined power and steering knuckle comprising the combination of an axle formed in sections, a universal joint connecting said axle sections, a housing through which said axle extends and in which said universal joint is rotatably mounted, a sleeve integral with said housing for the reception of a portion of said axle, pivot posts at the upper and lower ends of said housing, said pivot posts having ports extending longitudinally therethrough, an extension at the inner end of the port of the upper post, a cap screw at the outer end of the port of the lower post, a casing surrounding said housing and having tubular extensions to receive said pivot posts, bushings between said pivot posts and extensions, and a closure cap for the open end of the lower tubular extension.

2. A combined power and steering knuckle comprising a hollow housing having a pivot post at its upper and lower ends, a casing surrounding said housing and having a tubular extension at its upper and lower ends, a bushing between each pivot post and tubular extension, said pivot posts and extensions having shoulders, said bushings having flanges to engage said shoulders, the upper bushing being of less length than the height of the pivot post and tubular extension to form a channel, each pivot post having a vertically extending port, an extension plug at the inner end of the port of the upper pivot post, a closure for the lower end of the port of the lower pivot post, and a closure cap for the lower end of the lower tubular extension.

In testimony whereof I have signed my name to this specification in the presence of two subscribing witnesses.

HENRY W. BARGER.

Witnesses:
 WALTER BREWER,
 LEVI N. BRUEN.